United States Patent
Baumeister et al.

(10) Patent No.: US 11,473,587 B2
(45) Date of Patent: Oct. 18, 2022

(54) FAN

(71) Applicant: GE Renewable (Switzerland) GmbH, Birr (CH)

(72) Inventors: Stefan Albert Baumeister, Birr (CH); Hubert Christof Baumeister, Birr (CH)

(73) Assignee: GE Renewable (Switzerland) GmbH, Birr (CH)

( * ) Notice: Subject to any disclaimer, the term of this patent is extended or adjusted under 35 U.S.C. 154(b) by 5 days.

(21) Appl. No.: 16/640,775

(22) PCT Filed: Aug. 24, 2018

(86) PCT No.: PCT/EP2018/072914
§ 371 (c)(1),
(2) Date: Feb. 21, 2020

(87) PCT Pub. No.: WO2019/038436
PCT Pub. Date: Feb. 28, 2019

(65) Prior Publication Data
US 2021/0131443 A1    May 6, 2021

(30) Foreign Application Priority Data
Aug. 24, 2017 (EP) .................................. 17187792

(51) Int. Cl.
*F04D 29/28* (2006.01)
*F04D 29/30* (2006.01)
(Continued)

(52) U.S. Cl.
CPC ......... *F04D 25/082* (2013.01); *F04D 25/166* (2013.01); *F04D 29/282* (2013.01);
(Continued)

(58) Field of Classification Search
CPC .. F04D 25/0606; F04D 25/082; F04D 25/166; F04D 29/282; F04D 29/30; F05D 2240/301; F05D 2240/305; H02K 9/06
See application file for complete search history.

(56) References Cited

U.S. PATENT DOCUMENTS 3,725,706 A * 4/1973 Lukens .................... H02K 5/10
310/62
4,255,080 A * 3/1981 Wilson ................ F04D 29/4213
415/58.2
(Continued)

FOREIGN PATENT DOCUMENTS

DE        1052052 B      3/1959
EP        2602917 A1     6/2013
(Continued)

OTHER PUBLICATIONS

PCT International Search Report Corresponding to PCT/EP2018/072914 dated Oct. 19, 2018.

*Primary Examiner* — Ninh H. Nguyen
(74) *Attorney, Agent, or Firm* — Dority & Manning, P.A.

(57) ABSTRACT

A radial fan comprising:
a plurality of blades rotatable about an axis of rotation and extending radially from the axis of rotation;
characterised in that each of the blades has a transverse profile that is symmetrical about a radial line of symmetry extending through the blade, at least a portion of the profile of each blade being curved.

12 Claims, 9 Drawing Sheets

(51) Int. Cl.
  *F04D 25/08* (2006.01)
  *F04D 29/58* (2006.01)
  *F04D 25/16* (2006.01)
  *H02K 9/06* (2006.01)
(52) U.S. Cl.
  CPC ............ *F04D 29/584* (2013.01); *F04D 29/30* (2013.01); *F05D 2240/301* (2013.01); *F05D 2240/305* (2013.01); *H02K 9/06* (2013.01)

(56) References Cited

U.S. PATENT DOCUMENTS

| | | | | |
|---|---|---|---|---|
| 4,795,311 | A * | 1/1989 | Arkhipov | F04D 29/284 416/186 R |
| 6,700,235 | B1 * | 3/2004 | McAfee | H02K 9/06 310/52 |
| 7,736,129 | B2 * | 6/2010 | Matsuo | H02K 9/06 416/186 R |
| 8,963,356 | B2 * | 2/2015 | Roos | H02K 1/278 290/52 |
| 9,004,868 | B2 * | 4/2015 | Rhodes | F04D 29/281 29/889.4 |
| 9,013,077 | B2 * | 4/2015 | Maeda | H02K 9/06 310/63 |
| 9,030,064 | B2 * | 5/2015 | Haga | H02K 9/14 310/59 |
| 9,664,055 | B2 * | 5/2017 | Yagi | F01D 5/30 |
| 9,903,385 | B2 * | 2/2018 | Kawanishi | F04D 29/601 |
| 2011/0064571 | A1 * | 3/2011 | Lind | F04D 29/441 415/206 |
| 2013/0119796 | A1 | 5/2013 | Maeda | |
| 2021/0164492 | A1 * | 6/2021 | Mecozzi | F04D 29/4213 |

FOREIGN PATENT DOCUMENTS

JP  2003088045 A  3/2003
WO  WO2009138636 A1  11/2009

* cited by examiner

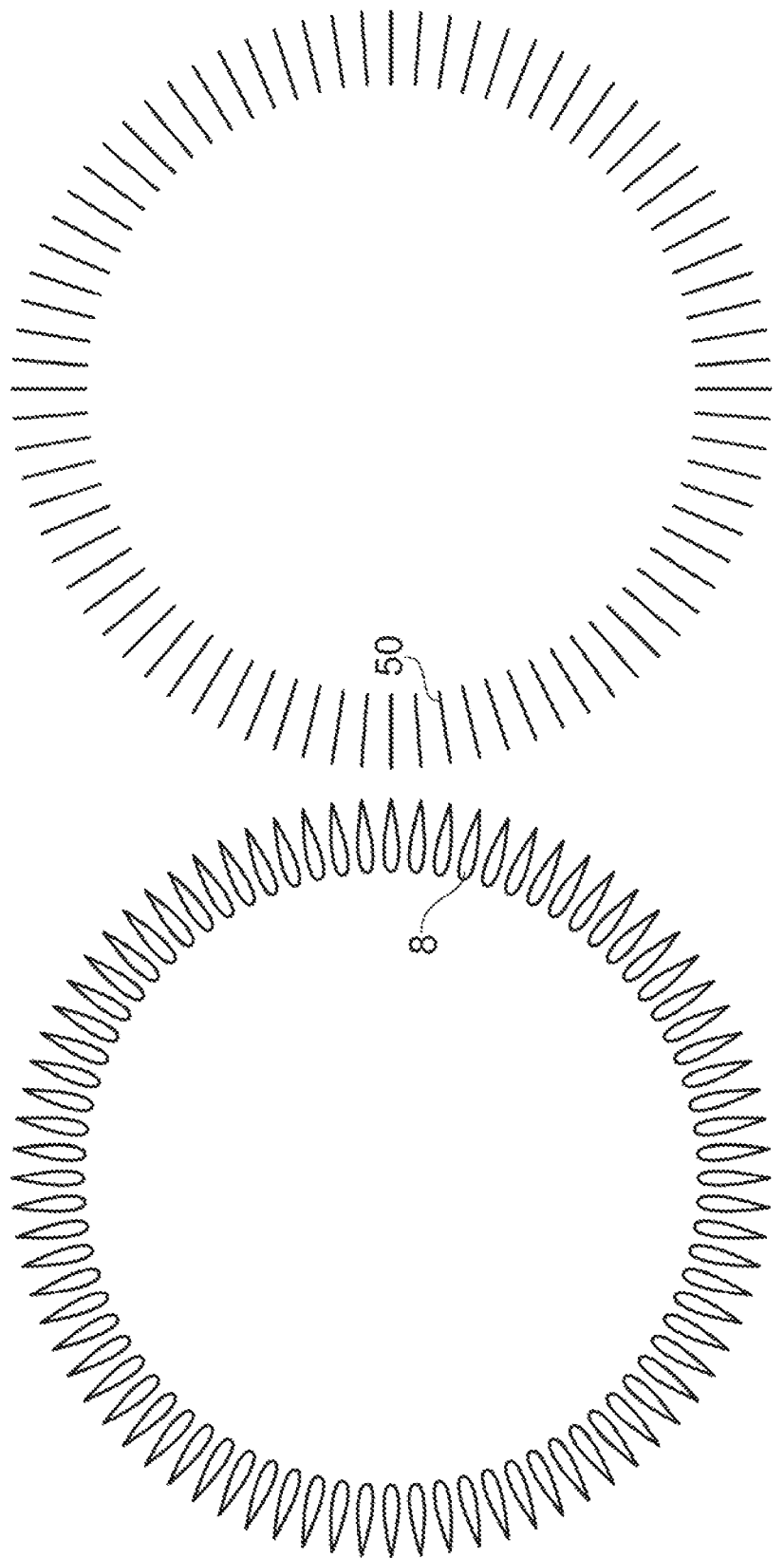

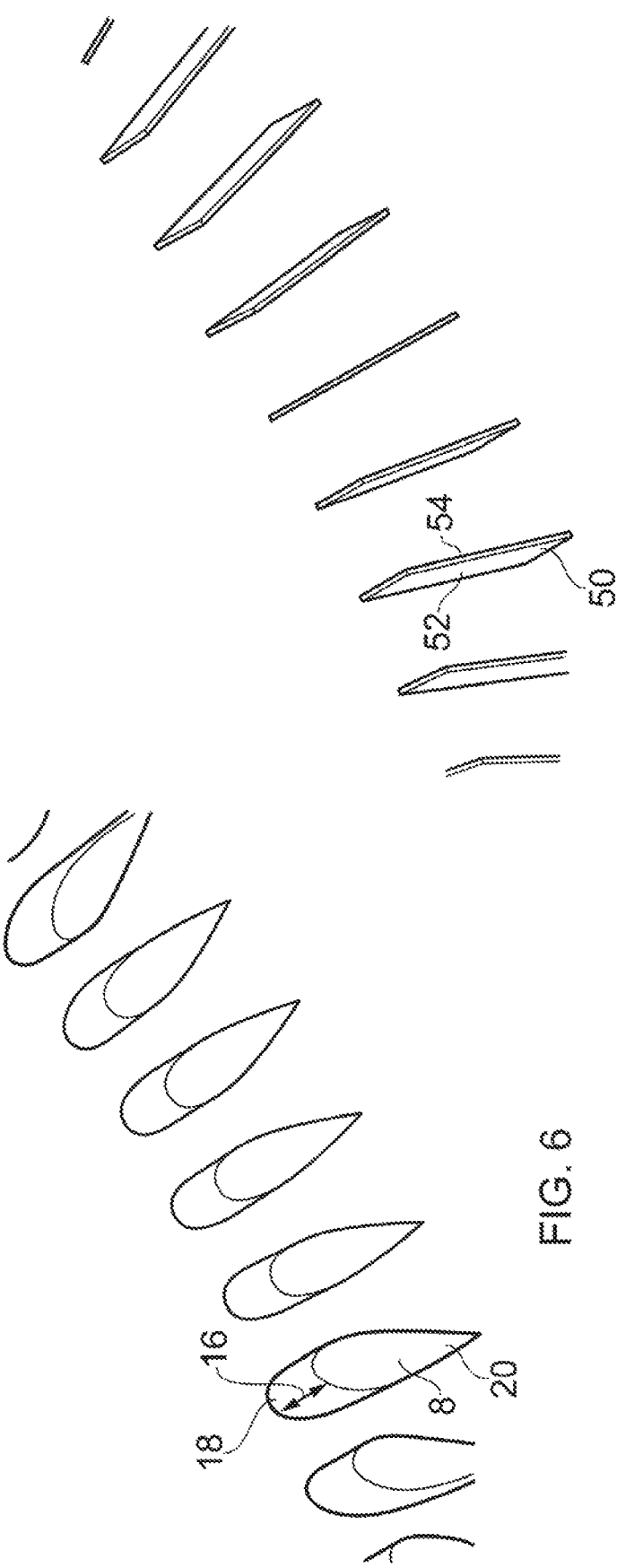

| Parameter | Bidirectional radial fan with radial straight fan blades (Prior Art) | Bidirectional radial fan with symmetrical profiled fan blades according to embodiments of the invention |
|---|---|---|
| Medium | Air with 1.08 kg/m³ density | Air with 1.08 kg/m³ density |
| Rotational velocity | 600 rpm | 600 rpm |
| Inner diameter | 2800 mm | 2800 mm |
| Outer diameter | 3448 mm | 3448 mm |
| Number of blades | 80 | 80 |
| Blade height at inner diameter | 69.25 mm | 69.25 mm |
| Blade height at outer diameter | 57.23 mm | 57.23 mm |

FIG. 9

FAN

This invention relates to a fan, and particularly, but not exclusively, to one-directional and bi-directional radial fans for use with one-directional and bi-directional machines respectively.

It is known that radial cooling fans may be adapted to reduce noise in motors for vehicles, as disclosed in Japanese Patent Application Publication Number JP 2003088045. Radial fans such as those described in JP 2003088045 comprise a plurality of blades that extend radially outwards from a central hub and rotate in a single direction.

However, noise reduction is of little concern in hydroelectric systems in which electrical power is generated from the flow of water. An example of a hydroelectric system is disclosed in International Patent Application Publication Number WO 2009/138636 A1.

Cooling fans are used to cool machines such as electric generators in hydroelectric systems. In order for a radial fan to cool an electric generator, the fan is adapted to be mounted on a shaft, or rotor, of the electric generator. The fan rotates about a central axis of rotation of the electric generator.

In pump-turbine hydroelectric systems electricity is generated or converted into potential energy by using an artificial lake or a reservoir, from where water is guided to a pump, a turbine or a pump-turbine. The pump, turbine or pump-turbine is typically connected to an electric motor, generator or motor-generator that can generate electricity and/or pump water into the artificial lake or the reservoir to store the energy as potential energy.

Electrical motor-generators that are connected to a pump-turbine need to either generate electricity in turbine mode or they consume electricity in pump mode. This means that depending on the use, the electrical motor-generators are required to rotate in either direction. In either mode, electrical motor-generators generate heat.

The prior art fails to provide a cooling system or a radial fan for a hydroelectric machine that can cool the machine in either pump or turbine mode. Accordingly, there is a need to cool pump-turbines when working in either pump mode or turbine mode which is not fulfilled by the prior art.

The invention over comes the drawbacks of the prior art by providing, according to a first aspect of the present invention, a radial fan preferably suitable for a hydroelectric machine. The hydroelectric machine may comprise an electrical motor-generator that may be connected to a pump-turbine. The radial fan may comprise a plurality of blades rotatable about an axis of rotation. The plurality of blades may extend radially from the axis of rotation. Each of the blades may have a transverse profile which may be symmetrical about a radial line of symmetry extending through the blade, wherein at least a portion of the profile of each blade may be curved.

The term "transverse profile" means the shape of a face of the blade lying in a plane that is normal to the axis of rotation.

The blades of prior art radial fans for hydroelectric machines have a variety of different shapes. However, in known radial fans, each blade has substantially straight edges extending in a radial direction, which edges are substantially parallel to one another.

The invention advantageously enables radial fans to be used to cool a motor-generator in either pump mode or turbine mode. Radial fans according to the prior art are limited by their ability to rotate in one direction only, and thereby cool effectively in a single rotational direction. The invention preferably provides a reversible, or bi-directional, fan that cools a motor-generator in either pump mode or turbine mode. With a fan according to the invention, the same pressure and rate of air flow is generated independent of the direction of rotation. The direction of air flow remains unchanged. The fan is preferably mounted on a rotational shaft of the hydroelectric machine. Preferably, the fan is mounted on the shaft of the rotor of a motor-generator, such that the fan rotates with the shaft in either direction to cool the motor-generator.

Because of the symmetrical profile of each blade, it has been found that a fan according to the present invention that is suitable for a hydroelectric machine has a considerably better performance with respect to static pressure generation and efficiency compared to fans having straight blades. By providing an efficient cooling system, the invention enables large increases in power efficiency when generating electricity or converting electricity to potential energy.

Preferably, the fan according to the invention has a diameter equal to or more than three metres. A fan according to the invention having dimensions suitable for use with a hydroelectrical machine for the production and storage of energy on an industrial scale, is not subject to the drawbacks of the prior art.

It has also been found that a fan according to the invention can generate a higher static pressure and thus facilitate a higher flow rate than a known radial fan for a hydroelectric machine having straight blades of similar dimensions.

In addition, the fan according to the present invention may have much smaller dimensions, for example, a smaller diameter, compared to known radial fans for hydroelectric machines yet still facilitate the same flow rate as those larger known fans having straight blades.

Further, a fan according to the present invention has a higher efficiency due to the symmetrical profile of the blades. This considerably reduces the power consumption on the shaft on which the fan is mounted.

As mentioned above, in such a fan, the same pressure is generated independent of the direction of rotation. The direction of air flow remains unchanged. Circumstances under which this can be useful may be for example within hydroelectric systems.

In some embodiments of the invention, the transverse profile of each blade may define a tear-drop shape.

Other transverse shapes are also possible. For example, the transverse profile of each blade may define a substantially rectangular shape having rounded opposite ends. In such an embodiment each blade may have a shape comprising opposite substantially parallel straight sides defining a longer dimension of each blade, and preferably rounded opposite shorter ends. This shape is sometimes known as a stadium.

In some embodiments of the invention, the axial thickness of each blade may vary radially along the blade.

In some embodiments of the invention, the axial thickness of each blade may decrease with increasing distance from the rotational axis. It has been found that this reduces delamination on the fan blade leading to further efficiencies in the fan.

In some embodiments of the invention the radial fan may comprise an upper sealing component and/or a lower sealing component.

In embodiments of the invention, the upper sealing component may comprise an upper flange. The upper flange may at least partially define an air inlet, or the upper sealing component may comprise the air inlet. The presence of the air inlet reduces the pressure loss of air on entry into the radial fan. In some embodiments of the invention the upper flange may be rounded, for example, the cross-sectional area of the air inlet reduces as air drawn through the inlet, to further reduce such pressure loss.

Similarly, the lower sealing component may comprise a lower flange. The lower flange may at least partially define the air inlet, or the lower sealing component may comprise the air inlet. The lower flange may be rounded.

In the context of this specification the term "rounded" means that a component is shaped in a way to reduce sharp edges and to thereby ensure low pressure loss. In embodiments of the invention the lower sealing component may be connected directly to a rotor of a machine. The machine may be one-directional or bi-directional and may, for example comprise an electric motor. The purpose of the upper sealing component is to prevent or reduce leakage of air flows, and in this respect the upper sealing component may form part of an overall sealing system. The sealing system may be adapted to seal the rotating parts of the fan against stationary air guides.

The upper and lower sealing components may be used to mount the fan blades between them and to thereby fix the fan blades in position between the upper and lower sealing components.

According to a second aspect of the present invention there may be provided a machine comprising a rotor with an axis of rotation about which the bi-directional machine may be rotatable, and preferably a radial fan according to the first aspect of the invention which fan may be mounted on the rotor of the machine.

The machine may be one-directional or bi-directional and may, for example comprise an electric motor.

In such embodiments of the invention, the axis of rotation about which the plurality of blades is rotatable may be co-axial with the axis of rotation about which the machine is rotatable.

In some embodiments of the invention, the machine may comprise two radial fans according to the first aspect of the present invention, which radial fans may be mounted at either end of the rotor.

In some embodiments of the invention, the machine may comprise an electric motor-generator. The electric motor-generator may be used in a number of different ways. In some embodiments of the invention the electric motor generator may form part of a hydroelectric system. In such embodiments the electric motor generator may be bi-directional, and the radial fan may also be di-directional.

According to a third aspect of the present invention there is provided a blade forming part of a radial fan according to the first aspect of the invention.

In some embodiments of the invention, the radial fan may be bi-directional.

The invention will now be further described by way of example only with reference to the accompanying drawings in which:

FIG. 5 is a schematic representation comprising the cross-sectional shape of the blades of the fan of FIG. 2 with straight blades from a conventional fan;

FIG. 6 is a schematic representation showing the shape of the blade of a fan according to embodiments of the invention in more detail;

FIG. 7 is a schematic representation showing the shape of known blades in more detail;

FIG. 9 is a table showing the parameters of a conventional radial fan having straight blades compared to the parameters of a radial fan according to an embodiment of the invention;

Figure 1:
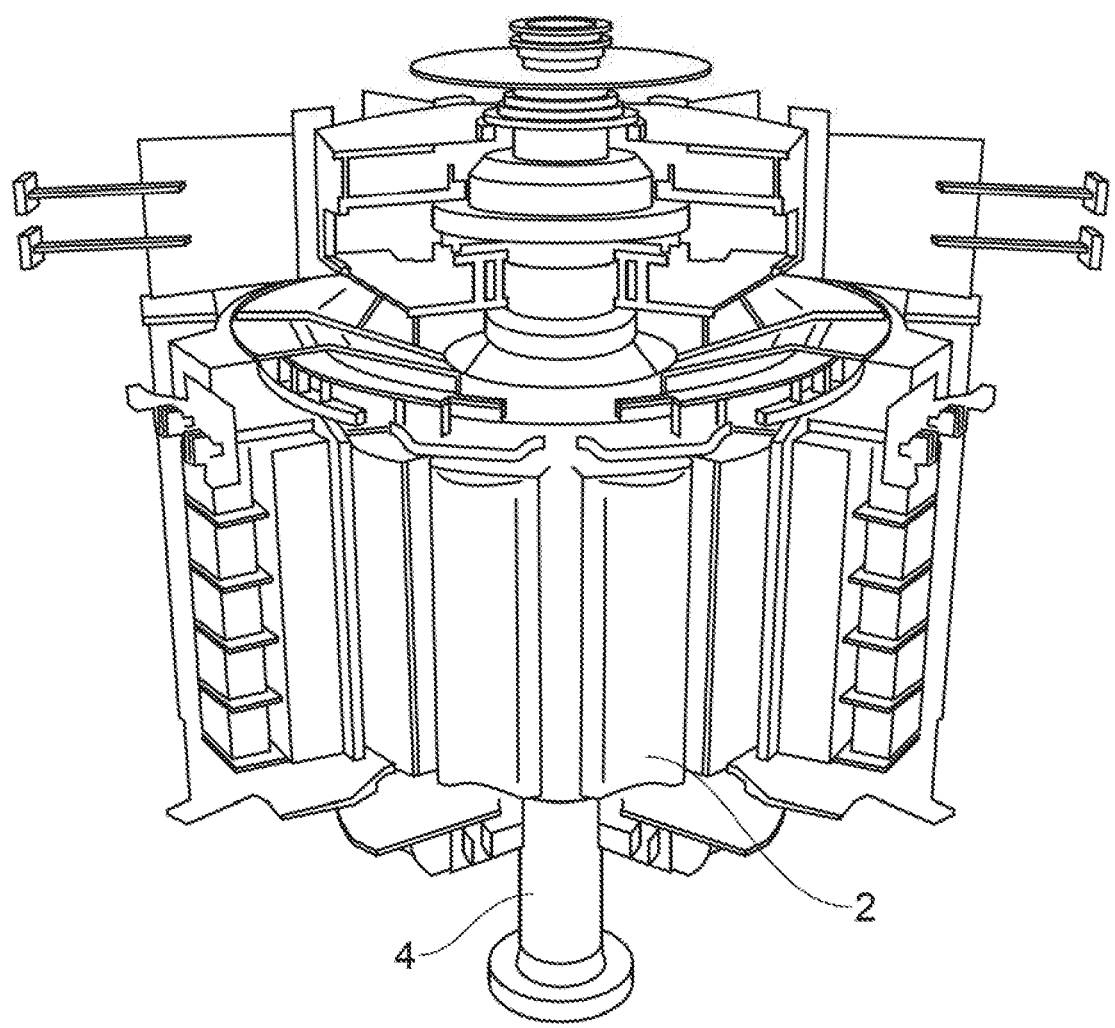
FIG. 1 is a schematic representation of a machine according to an embodiment of the second aspect of the invention incorporating a fan according to an embodiment of the first aspect of the invention.
Figure 3:
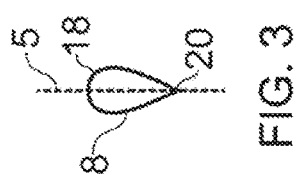
FIG. 3 is a detailed representation of one of the blades forming the fan shown in FIG. 2.
Figure 4:
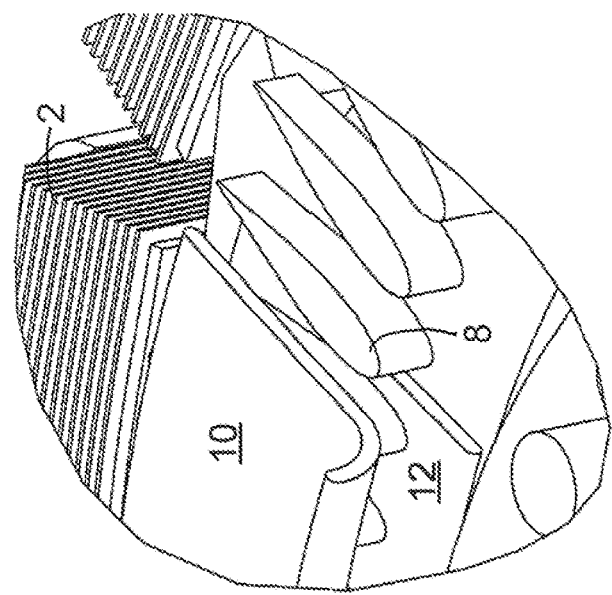
FIG. 4 is a detailed schematic representation of a portion of the fan of FIG. 2.
Figure 2:
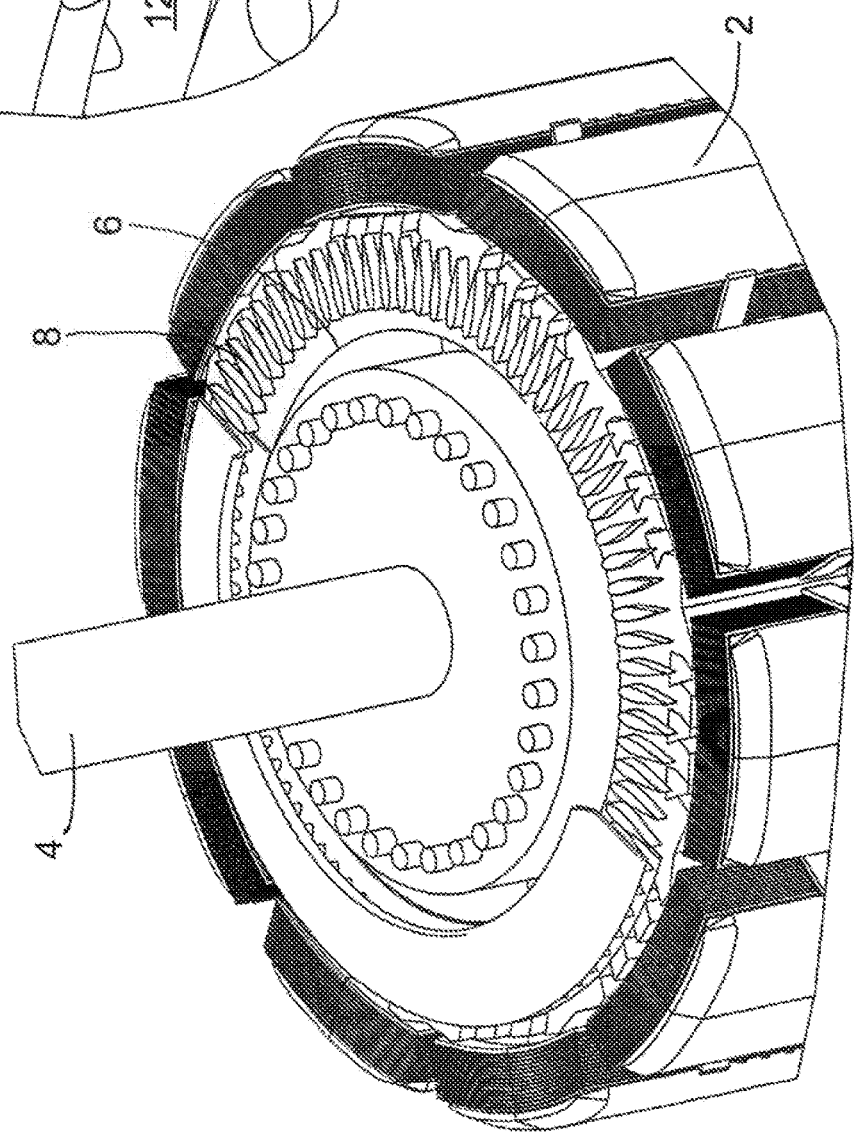
FIG. 2 is a schematic representation of a portion of the machine of FIG. 1 showing the fan and a rotor of the machine in more detail.

Referring initially to FIGS. 1, 2, 3 and 4, the rotor of a machine in the form of an electric motor-generator is designated generally by the reference numeral 2. The rotor 2 rotates about a shaft 4. In this embodiment, the motor is a bi-directional motor and thus can rotate in both directions around the shaft 4. In other embodiments, the motor may be one-directional.

The machine further comprises a fan designated generally by the reference numeral 6. In this embodiment of the invention the fan comprises a plurality of blades 8 which extend radially from an axis of rotation that is co axial with the shaft 4. In this embodiment of the invention the fan 6 is positioned within components of the rotor 2 in order to cool the electric motor-generator during use of the motor.

Because the motor-generator is a bi-directional motor generator, in this embodiment, the fan 6 according to embodiments of the first aspect of the invention must also be able to operate bi-directionally. In other embodiments of the invention the motor generator may be one directional and therefore the fan 6 may also be one directional.

In some embodiments of the invention, the electric motor-generator 2 will comprise two fans 6 positioned at opposite ends of the rotor 2.

Figure 8:
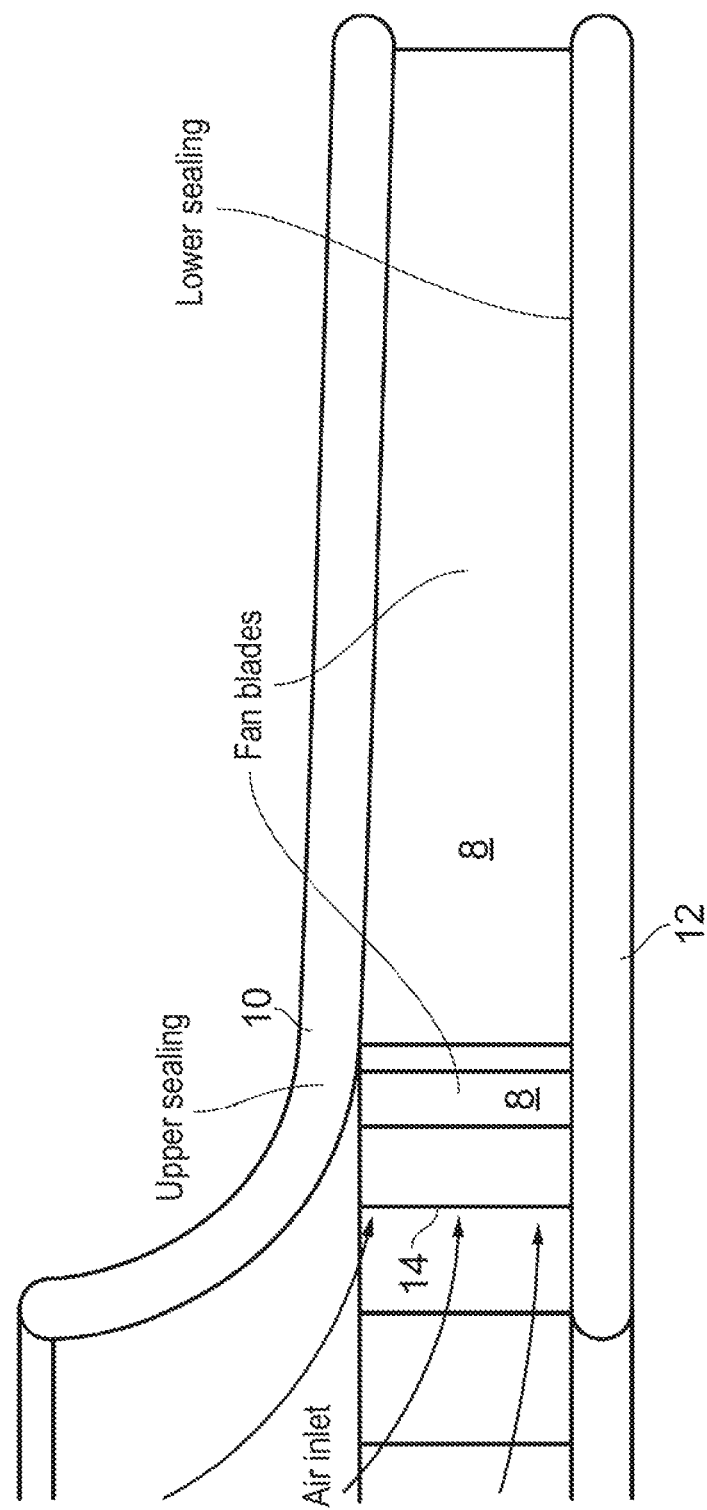
FIG. 8 is a schematic representation showing the upper and lower sealing portions of the fan of FIG. 2.

The fan 6 further comprises an upper sealing component 10 and a lower sealing component 12 shown in more detail in FIG. 8. The edge of the upper sealing component 10 is designed to provide a flange that partially defines an air inlet 14 as shown in FIG. 8. The air inlet 14 serves to reduce the pressure loss at entry into the radial fan 6. In an alternative embodiment of the invention, in order to further facilitate this reduction in pressure loss, both the upper and lower sealing components 10, 12 are rounded.

The lower sealing component 12 is, in this embodiment, mounted directly onto the rotor 4 of the electric motor-generator.

The lower sealing component 12 is, in this embodiment, connected directly onto the rotor 2.

The purpose of the upper sealing component 10 is to reduce or prevent leakage air flows. In this respect the upper sealing component 10 is, in this embodiment, part of a sealing system (not shown) that seals the rotating parts of the fan 6 against stationary air guides.

The fan blades 8 are located between the upper sealing component 10 and the lower sealing component 12. The upper sealing component 10 and/or the lower sealing component 12 may be used to mount the fan blades 8 between the two components 10, 12 and to thus fix them in position between the two sealing components 10, 12.

The shape of the blades 8 will now be discussed in more detail.

As can be seen from FIGS. 2, 3, 4, 5 and 6, each of the blades 10 has a rounded symmetrical transverse profile. More specifically, each blade is symmetrical about an axis of symmetry S which extends radially from the shaft 4. This is shown in more detail in FIG. 4.

A further feature of the shape of each blade is that the profile is rounded at least in parts of the profile, as well as being symmetrical about the axis of symmetry S.

In the illustrated embodiment, the shape of each blade is tear-drop shaped, although other shapes would be possible. For example, each blade could be substantially rectangular in shape having opposite rounded ends.

The shape of the blade 8 according to aspects of the present invention is contrasted with the shape of known blades 50 shown in FIGS. 5, 6 and 7.

It can be readily seen that known blades are substantially straight, having two edges 52, 54 which are parallel to one another.

Turning back to the blades 8 forming part of the present invention, each blade has a thickness 16 extending in an axial direction. In this embodiment of the invention a thickness 16 decreases with the radial distance from the shaft 4.

In other words, the thickness 16 at the rounded end portion 18 of each blade 8 is greater than at the narrower end 20 of each blade.

The symmetrical transverse shape of the blades 8 results in a superior fan performance regarding pressure generation and efficiency compared to fans with radially straight blades.

The performance of a fan according to embodiments of the invention will now be discussed with reference to a similar known fan having straight blades.

FIG. 9 sets out the parameters of the fans which were tested. The parameters set out in this table are exemplary only, and different parameters could prevail.

It can be seen that the dimensions of the prior art fan shown in the second column of the table are the same as the parameters of fan 6 according to an embodiment of the invention.

The performance of the two fans will be compared with Computational Fluid Dynamics (CFD). Both fans can be used with a bi-directional air cooled electrical motor-generator.

Figure 10:
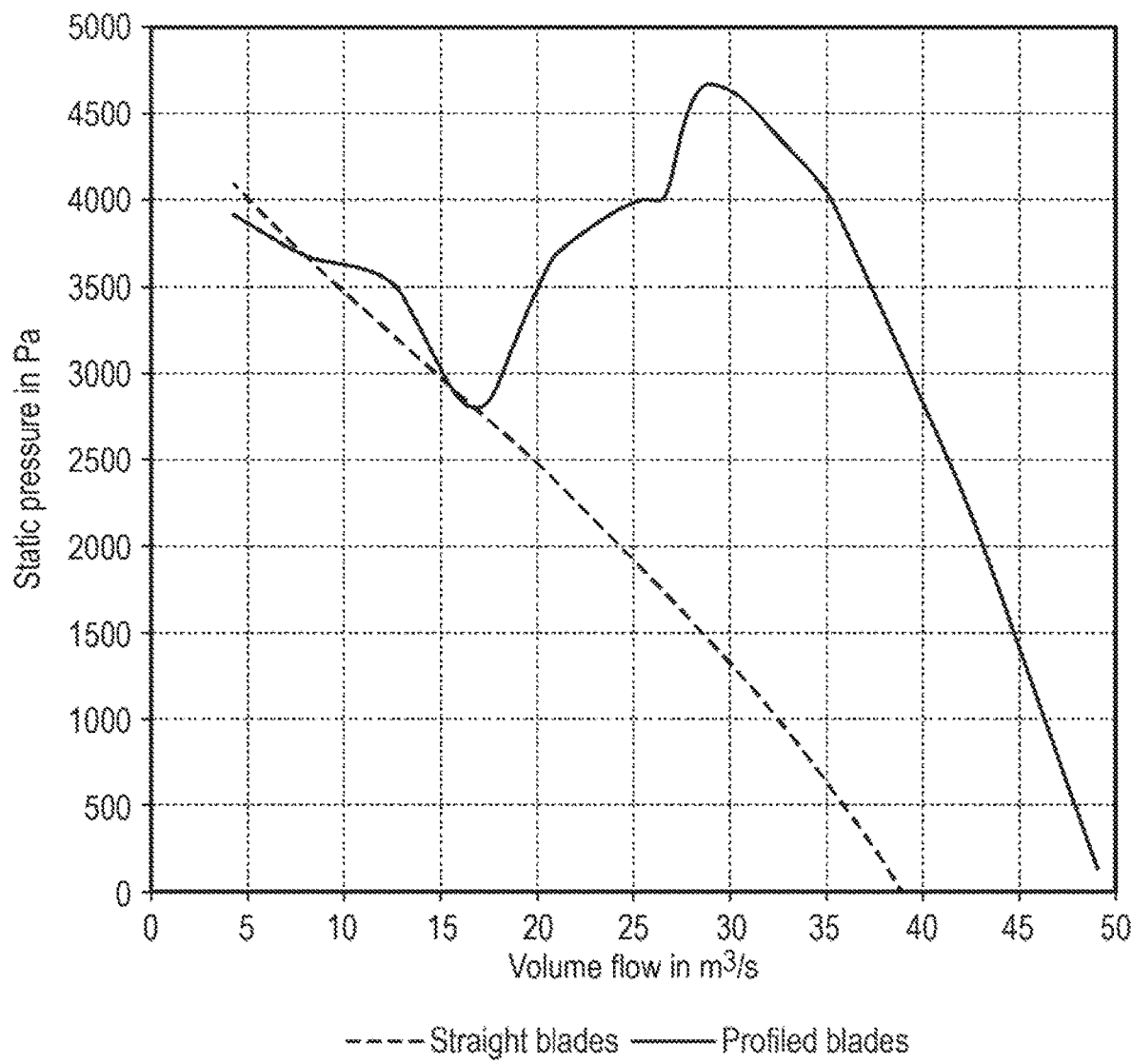
FIG. 10 is a graph showing how both the static generation and the efficiency of a fan according to embodiments of the invention are improved compared to known fans having straight blades.

For both fans, the fan performance was calculated with CFD. This study revealed that the symmetrical profiles of the blades 8 in fan 6 have a considerably higher static pressure generation in wide volume flow range. As shown in FIG. 10, the bi-directional radial fan according to embodiments of the invention generates around 3.4 times higher static pressure for a volume flow of 30 m$^3$ s$^{-1}$.

Figure 11:
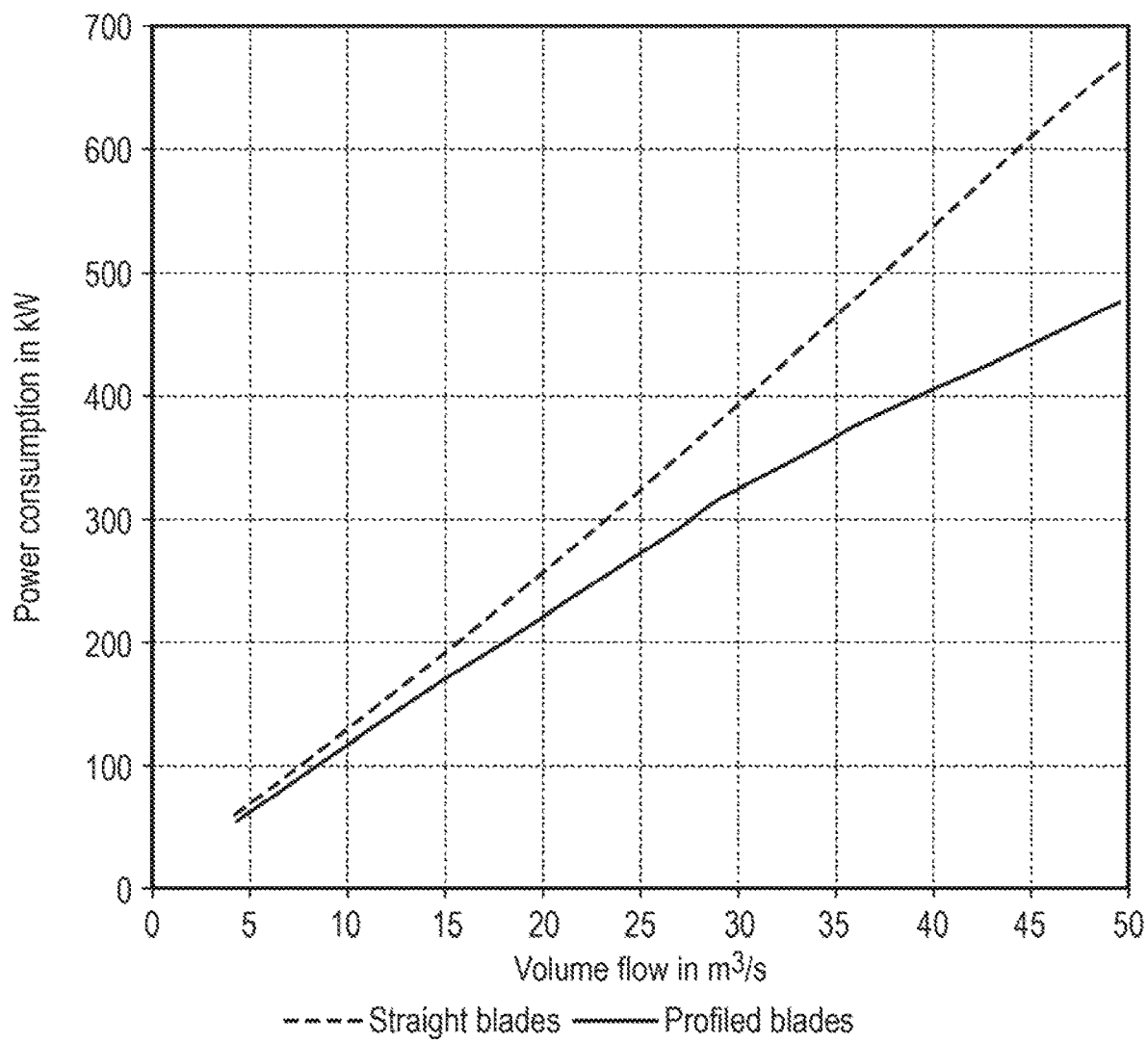
FIG. 11 is a graph showing a reduced power consumption for a given flow rate for a fan shown in FIG. 2 compared to that of a known fan.

The fan 6 according to the invention facilitates a much higher cooling air flow than a fan according to the prior art. The fan according to the invention can be used to reduce the temperature of the electric motor-generator or to increase the power of the motor-generator. In addition to the improvement in the static pressure generation, the efficiency is also considerably higher. The higher static efficiency leads to a lower power consumption of the fan according to embodiments of the invention which is shown in FIG. 11.

The superior performance of the fan 6 according to aspects of the present invention can be explained by considering the behaviour of flow around the blades. This is shown in FIG. 12 for a flow rate of 30 m$^3$ s$^{-1}$.

Figure 12:
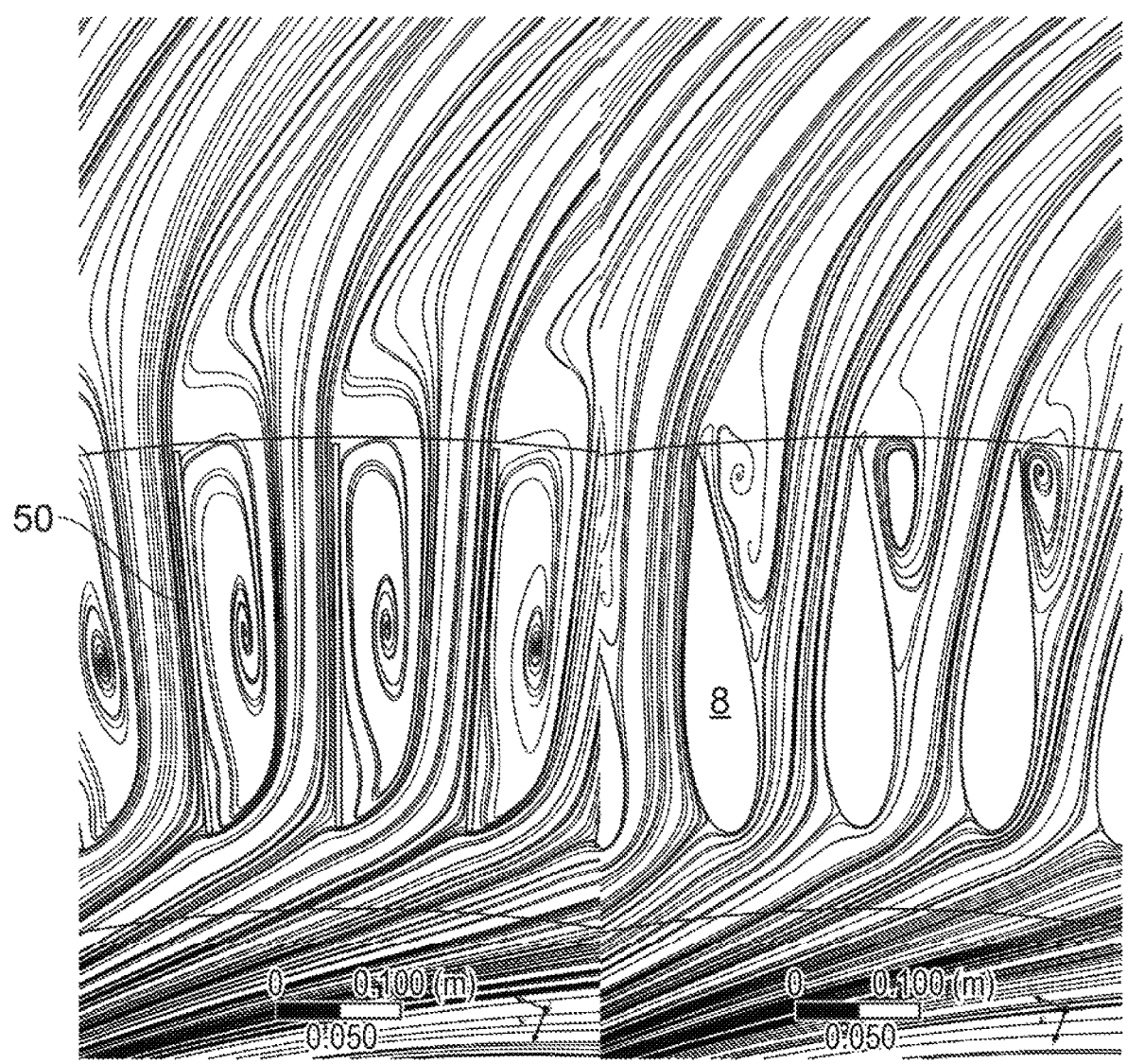
FIG. 12 is a schematic diagram showing how the improved performance of the radial fan according to embodiments of the invention can be explained in terms of flow behaviour around the blades which is shown in FIG. 10 for a flow rate of 30 m$^3$/s.

The left-hand portion of FIG. 12 shows the flow behaviour around the straight blades of a known fan, and the right-hand portion of FIG. 12 shows the flow behaviour around the symmetrically profiled blades 8 of the fan 6 according to the invention. This shows that the fan 6 has considerably less delamination compared to the known fan. This explains the superior fan performance of the fan according to the invention.

The invention claimed is:

1. A hydroelectric machine comprising:
   an electric motor-generator;
   a radial fan disposed to cool the electric motor-generator, the radial fan further comprising:
     a plurality of blades rotatable about an axis of rotation and extending radially from the axis of rotation;
     each of the blades comprising a transverse profile that is symmetrical about a radial line of symmetry extending through the blade, and wherein at least a portion of the transverse profile is curved;
     a lower sealing component;
     an upper sealing component;
     the blades disposed between the upper and lower sealing components; and
     the upper sealing component comprising an upper flange that curves towards the axis of rotation and extends radially inward towards the axis of rotation beyond a leading axial end portion of the blades, the upper flange defining an air inlet to the leading axial end portions of the blades such that incoming air changes direction at the air inlet from axial flow to radial flow through the blades at a location radially inward the leading axial end portions of the blades.

2. The hydraulic machine as claimed in claim 1, wherein the radial fan has a diameter equal to or in excess of three metres.

3. The hydraulic machine as claimed in claim 1, wherein the transverse blade defines one of a tear-drop shape, a stadium shape, or a rectangle having rounded ends.

4. The hydraulic machine as claimed in claim 1, wherein the upper flange is rounded at a radially inward surface thereof towards the axial flow of the incoming air.

5. The hydraulic machine as claimed in claim 1, wherein the lower sealing component comprises a lower flange defining the air inlet.

6. The hydraulic machine as claimed in claim 5, wherein the lower flange is rounded.

7. The hydraulic machine as claimed in claim 1, wherein an axial thickness of each blade varies radially along the blade.

8. The hydraulic machine as claimed in claim 1, wherein an axial thickness of each blade decreases with increasing distance from the axis of rotation.

9. The hydraulic machine as claimed in claim 1, wherein the radial fan is mountable on a rotational shaft of the hydroelectric machine to cool the hydroelectric machine in pump mode or in turbine mode.

10. The hydraulic machine as claimed in claim 9, wherein the radial fan cools the hydroelectric machine in pump mode when the fan rotates in a first direction and cools the hydroelectric machine in turbine mode when the fan rotates in a second direction.

11. The hydraulic machine according to claim 10, wherein the first direction is opposite to the second direction.

12. The hydraulic machine according to claim 1, comprising two of the radial fans at either end of the rotor.

* * * * *